Feb. 28, 1956  E. B. ATKINSON  2,736,450
OUTLET BOX SECURING DEVICE
Filed Sept. 20, 1951
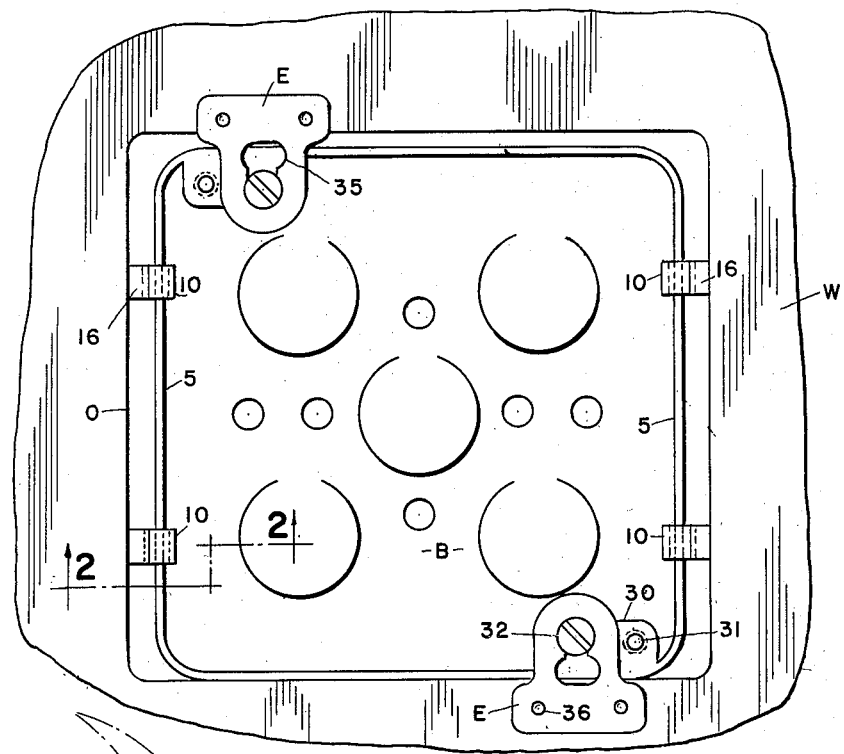
Fig. 1
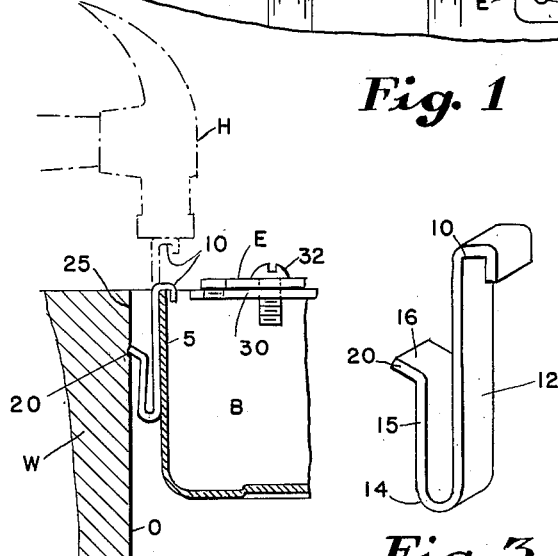
Fig. 2
Fig. 3
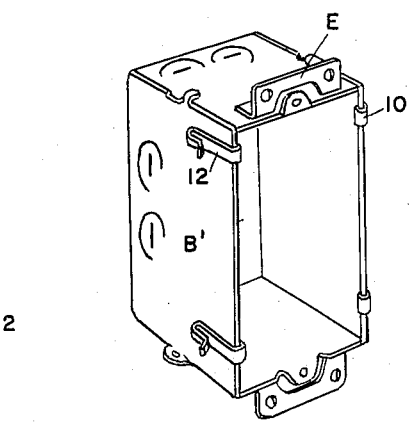
Fig. 4
INVENTOR.
Earl B. Atkinson
BY
Justin W. Macklin
ATTY

United States Patent Office 2,736,450
Patented Feb. 28, 1956

2,736,450

OUTLET BOX SECURING DEVICE

Earl B. Atkinson, Bay Village, Ohio

Application September 20, 1951, Serial No. 247,440

1 Claim. (Cl. 220—3.4)

This invention relates to devices for securing switch boxes or outlet boxes in wall openings. It is particularly concerned with holding such boxes in openings formed in walls of concrete or brick or any like materials formed of clay or ceramic products, for example.

Of course, it may be used where the opening is formed in walls made of wood where the thickness is sufficient that the surfaces inside the openings afford an area into which my securing devices may engage.

In the securing of switch or outlet boxes it is essential that the boxes be held firmly and permanently in position. Likewise, it is desirable that the securing devices may be convenient to use.

An essential object of the present invention, therefore, is to provide securing devices of great simplicity and which may be cheaply manufactured, easily applied to the box when in position, and which may serve to effectively and permanently secure the same.

It is also desirable that such devices may be used with boxes of different shapes and of varying depth.

Furthermore, it is necessary that such devices shall meet underwriters specifications in respect to firmly securing the box, as well as leaving the wire fastenings and contacts free from adjacent metal. The present securing device in no way interferes with the making of the connections of the wiring, and do not endanger them by proximity of the fasteners to the connections.

A specific object is to provide a plurality of uniformly shaped spring-gripping devices which may be inserted between the wall of the box and the surface of the opening in the wall, and which may be forced or easily driven into the holding and clamping position.

Other advantages and novel characteristics of my holding devices will become apparent in the following specification which relates to the accompanying drawings, in which:

Fig. 1 is an elevation looking toward the inside of a switch box or outlet box, and showing it held in position in a wall opening by a plurality of my fasteners;

Fig. 2 is a section through one side of the box and the adjacent portion of the wall, showing one of my fasteners in operative holding position, and also showing in broken lines the manner of driving the same into position;

Fig. 3 is a perspective view on an enlarged scale of one of my fastening devices;

Fig. 4 is a perspective view showing a different form of switch box with the fasteners in position on the box, the wall being omitted.

Referring to the drawings by the use of reference characters, W indicates a wall in which is formed a rectangular opening O for receiving the switch box B.

For the purpose of the present embodiment of my invention it should be considered that this opening is formed in a material such as concrete, brick, clay tile or the like, although, as indicated, it may be of wood. The thickness of the wall may vary from somewhat less than the depth of the usual switch box up to any thickness. For example, the switch box opening may be formed in the side of a hollow concrete building block. It may be cut through the side of a hollow building wall tile, or it may be made in a wall such as brick or the like. In any event, the opening is substantially rectangular, and its surfaces may be rather smooth or somewhat irregular so long as there is substantially uniform clearance between the side walls of the switch box and the inner surfaces of the switch box opening.

My securing devices constitute resilient clamping and securing members engaging the outer edges of the switch box walls 5. Each securing member extends inwardly along the outside of the switch box between it and the adjacent surface O of the opening in the wall, and by resilient action urges a sharp shoulder into engagement with and preferably indenting the wall material of the wall surface. The combined action of these members permanently and firmly holds the box in position.

Such boxes are provided with outwardly extending members such as ears, indicated at E, lying against the outer face of the wall and holding the edges of the open side of the switch box substantially in the plane of the wall.

A form of my securing device which has proven satisfactory in use comprises a single narrow spring strip of metal having a hook portion 10 at one end, adapted to fit over the edge of the wall of the switch box, and having a substantially flat portion 12 adapted to extend along and lie against the outer face of the switch box wall 5. The strip is then curved outwardly and back along the length of the flat portion 12, thus forming a bend 14, continued in a spring arm 15 terminating in an outwardly extending lip 16. This lip has an edge 20 adapted to indent or at least sharply engage the material of the wall W.

In use, the arm 15 is sprung under tension toward the box, and the flat portion 12 continues to exert an outward pressure reacting against the box and pressing the edge 20 into the wall.

The outwardly turned portion 16 is preferably sloped, as shown, so that it may slide over the edge 25 at the outer perimeter of the opening in the wall as it is forced or driven into position.

In Fig. 2 the hook portion 10 of the securing device is shown, in broken lines, above the edge of the box which is the position after the loop portion 14 and 15 of the securing element is inserted between the box and the surface of the opening in the wall, and at H is indicated a hammer driving the same inwardly, although it may be forced into holding position by any suitable tool.

The outside width of the loop 14 should be at all times less than that of the space between the switch box wall 5 and the inner face of the opening O, so that the full force of the spring action will be exerted against the edge or point 20.

In Fig. 4 is shown another form of switch box B'. Here is illustrated a narrower box with the securing members in position, but with the wall portion omitted from the view. This box is provided with the usual fixed ears E' and, of course, the opening in the wall would be made to conform to the size and shape of such a box.

The larger or double form of switch box shown in Figs. 1 and 2 is not usually provided with fixed ears, but inwardly turned tabs 30 may be provided with one or more threaded openings 31 to receive screws 32 passing through the removable ears E, each of which are provided with slots 35 having a narrow inward portion and an enlarged opening whereby it may be passed over the heads of a screw 32 for convenient assembly and removal.

As shown, I use four securing clips having their hooks engaging the edges of opposite walls 5, and preferably positioned near the corners of the box, and I have found by experience that these securing devices will firmly hold the switch box in openings made in the various forms of masonry material, as well as in wood, or the like.

The securing devices may be very cheaply manufactured; obviously they are easily applied, and afford a means of securing boxes in wall openings of greater than usual thickness as well as functioning to secure the boxes in masonry walls where it would be difficult or impossible to use securing screws.

In the case of using securing ears E in Figs. 1 and 2, these may be provided with indentations 36 forming projections on the inner or wall side, assuring desired contact against slightly irregular surfaces and further serving to prevent the box from slipping.

Having thus described my invention, what I claim is:

A combination with an outlet box and a wall having an opening adapted to receive the outlet box, the box having projections adapted to lie against the outer face of the wall, and the opening having two opposite sides parallel with and spaced from the sides of the outlet box, of a plurality of fastening devices comprising identical anchoring members adapted to be forced between the wall opening surface and the box, and each of said members being formed of a single narrow strip of flat spring metal and having at one end a hook engaging an outer side edge of the outlet box, and having a straight portion extending inwardly along a side of the box, the strip beyond the straight portion being curved outwardly in the form of a loop, the outside dimension of which is of less than the normal distance between the box and the wall opening, and the free end of the loop having a portion sloping away from the box at an acute angle and of a length substantially one-half of the width of the loop, the direction of the slope being such that said portion may be wedged inwardly toward the box as the anchoring element is forced into securing position.

References Cited in the file of this patent

UNITED STATES PATENTS

| | | |
|---|---|---|
| 2,065,651 | Burton | Dec. 29, 1936 |
| 2,150,258 | Woodings | Mar. 14, 1939 |
| 2,448,359 | Davison | Aug. 31, 1948 |